March 30, 1954  R. W. WILDE, SR  2,673,476
REMOTE CONTROL DEVICE
Filed March 31, 1953
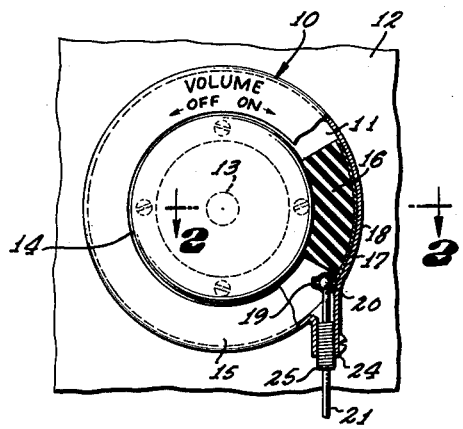
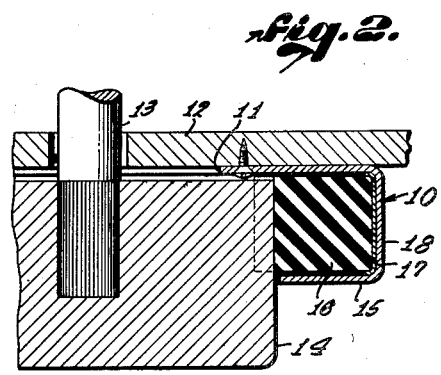
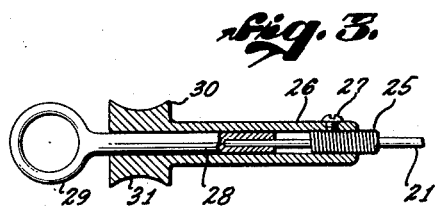
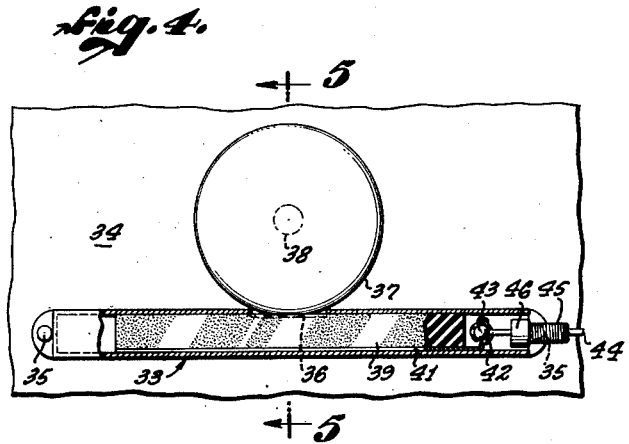
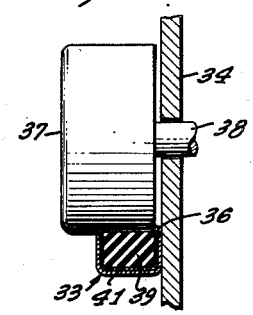
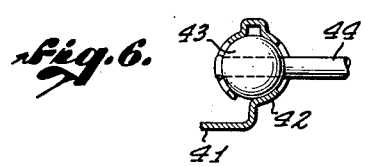
RALPH W. WILDE, SR.,
INVENTOR.
BY
ATTORNEY.

Patented Mar. 30, 1954

2,673,476

UNITED STATES PATENT OFFICE 2,673,476

REMOTE CONTROL DEVICE

Ralph W. Wilde, Sr., Los Angeles, Calif.

Application March 31, 1953, Serial No. 345,881

8 Claims. (Cl. 74—501)

This invention relates to control devices and more particularly to a control device for effecting adjustment of a mechanism at a place remote from the mechanism.

The device of the present invention is particularly adapted for controlling the tuning or volume control elements of television or radio receiving sets, although, as will be hereinafter seen, the device is not necessarily limited to such use.

Remote control devices heretofore proposed for operating tuning or volume control mechanisms of radio and television sets, as well as like apparatus, have been of a more or less intricate structure which not only increased the cost of these prior devices, but also complicated the installation and use as well. For these reasons such devices as have been previously proposed have not been adopted or used extensively.

The principal object of the present invention is to provide a novel remote control device for operating a rotatably mounted shaft from a distance and one which will permit manual control of the shaft itself through means of a manually operable knob carried by the shaft.

In many of the remote control devices heretofore proposed, the shaft controlled could not be manually rotated without operating or driving the remote control mechanism. This is not so in the device of the present invention, for the installation and use of the device does not in any way restrict or hinder normal manual control of the shaft.

The device of the present invention is entirely mechanical and is of extremely simple construction. The device is capable of being manufactured in large quantities at extremely low cost in comparison with previously proposed devices. It is simple to install and can be operated with the same ease as conventional control knobs.

This application is a continuation-in-part of my copending application Serial Number 239,760 filed August 1, 1951.

Other features and advantages of the present invention will be hereinafter apparent from the following description, particularly when taken in connection with the accompanying drawing in which Figure 1 is a plan view partly in section of one embodiment of the present invention;

Figure 2 is a section taken along line 2—2 of Figure 1;

Figure 3 is a fragmentary view of the operating elements actuatable at the place remote from the shaft to be adjusted;

Figure 4 is a view, partly in section and partly in elevation, of a modified form of the present invention;

Figure 5 is a section taken along line 5—5 of Figure 4; and

Figure 6 is a view, partly in section and partly in elevation, on an enlarged scale showing the connection between the means operable to actuate the knob and the remote control element.

The control device of the present invention in the embodiment shown in Figure 1, comprises an annular casing 10 having a relatively flat mounting wall 11 which is to be secured by conventional fastening means in facewise engagement with the panel 12 through which the shaft 13 projects. In the installation of the device of the present invention, the usual operating knob 14 carried by the projecting end of the shaft 13 is removed to permit the wall 11 to be mounted to the outer face of the panel 12 concentric with the shaft 13. The outer wall 15 of the casing 10 is formed with a centrally located opening of a diameter just slightly greater than the diameter of the knob 14. The knob 14 thus is received within this opening or aperture of the wall 15 as shown in Figure 1 and hides from view the fastening means holding the wall 11 to the panel 12.

The casing 10 together with the outer peripheral surface of the knob 14 forms an annular track or passageway in which is mounted a block 16 of some resilient material such as rubber. In the now preferred embodiment of the present invention, the block 16 is formed of a soft sponge rubber which is bonded or otherwise secured to a formed plate 17 of some suitable material. This plate 17 with the block 16 bonded thereto, is mounted for movement in the passageway formed by the knob and casing 10 with the plate 17 engaging the cylindrical wall 18 of the casing.

The block 16 is of a width just slightly larger than the width of the passageway so that there is a slight compression of the block 16 when mounted between the outer peripheral surface of the knob 14 and the inner or contiguous surface of the block 16. The compression, however, is sufficiently slight to permit the knob 14 to be grasped and rotated to drive the shaft 13 without appreciable interference between the knob 14 and the block 16.

The plate 17, referring now to Figure 1, at the one end thereof is formed with a spherical socket 19 receiving a swivel ball element 20 rotatably mounted to the one end of an elongated strand 21 extending through an aperture formed in the wall of the socket 19. The ball forms, as shown, a swivel connection between the plate 17 and strand 21.

The strand 21 is passed through a tubular guide element 24 carried by the cylindrical wall 18 of the casing to which is anchored one end of a tubular sheath 25 coextensive with the strand 21. The sheath 25 completely enclosed the strand 21 and the opposite end of this sheath is anchored, referring now to Figure 3, within one end of a sleeve 26 by means of a set screw 27 or some similar fastening device. The opposite end of the strand 21 is fixed to one end of a plunger element 28 which is telescopically mounted within the sleeve 26 for reciprocal movement relative thereto. The outer end of the plunger 28 carries an operating element 29 in the form of a ring through which one finger or thumb of a user may be inserted to exert push-pull forces to the plunger 28. To facilitate this operation the sleeve 26 is enlarged, as indicated at 30, and this enlargement is formed with an annular groove 31 to form finger engaging elements.

It will be seen that if the thumb of the one hand of the user is inserted through the ring 29 and the index and middle fingers of the user are disposed on opposite sides of the enlargement 30, movement of the thumb in opposite direction will result in push-pull forces being transmitted through the plunger 28 to the strand 21. As the strand 21 is encased by the sheath 25 these push-pull forces will be transmitted through the socket 19 to the plate 17 and in turn to the block 16 bonded to the plate 17.

As the strand 21 is moved in either direction within its sheath, the block 16, frictionally engaged with the knob, will rotatably drive the knob in one direction or the other depending upon the direction of movement of the strand 21. The swivel 20 prevents torque forces in the strand 21 from being transmitted to the plate 17 and the block 16 and obviates any danger of these torque forces twisting or canting the plate 17 in the passageway defined by the casing.

Although the frictional engagement between the soft rubber block 16 and the knob is sufficient to produce rotational movement of the knob as the block is moved, it is not sufficient to produce movement of the block when the knob is manually operated. This is due partially to the fact that the easily deformable material of the block adjacent the knob is longitudinally deformed as the surface of the knob moves thereon and partially to the fact that the quantum of friction between the plate 17 and the wall of the casing and between the strand 21 and its sheath is greater than the quantum of friction between the resilient block 16 and the periphery of the knob.

It will thus be seen that the device of the present invention provides a very simple but yet efficient control mechanism or device for controlling the angular position of the shaft 13 at a place remote from the shaft 13. Although the knob 14 can be easily rotated to bring about rotation of the shaft 13 through the device of the present invention, yet at any time that the block 16 is at rest, the knob 14 can be manually turned without producing movement of the block 16. This feature of the present device is not had in prior control devices where gear trains were used to produce movement between the operating mechanism and the driven knob or shaft. This is also true of those prior devices in which a flexible cable was passed around the knob or shaft and fixed thereto so that movement of the cable produced rotational movement of the knob. In this type of prior installation, as the cable was actually fixed about the shaft or knob, obviously manual movement of the knob produced movement of the cable.

In the embodiment of the invention shown in Figures 4 and 5, the casing is not annular in form but is elongate and is formed of a somewhat rectangular cross-sectional shape. This casing, indicated at 33, is mounted to the outer face of the panel 34 by some suitable fastening means such as the screws 35 shown. The one wall of the casing 33 is cut away, as indicated at 36, and the casing so mounted that the knob 37 fixed to the one end of the shaft 38 projects inwardly through the opening 36.

Mounted within the casing 33 for reciprocal movement is a block 39 of resilient material similar to that used to form the block 16. The block 39 is bonded or otherwise secured to a plate 41 which slideably engages the one wall of a casing 33. This plate, referring now to Figure 6, is formed with a spherical socket 42 receiving a ball 43 rotatably mounted to one end of an elongate strand 44. Here again the ball and socket form a swivel connection between the plate and the strand.

A sheath 45, similar to the sheath 25, encases the strand 44 and one end of this sheath is fixed within a hollow cylindrical boss 46 carried by the one end wall of the casing 33. The strand 44 is identical to the strand 21 and is reciprocally moved through a control mechanism such as shown in Figure 3. This mechanism will not again be described, but suffice it to say that push-pull forces exerted on the strand 44 produces reciprocal movement of the block 39 in the casing 33. As the knob 37 actually projects into the casing 33 through the opening 36, the peripheral surface of the knob 37 frictionally engages the one face of the block 39. Thus reciprocal movement of the block 39 will produce rotational movement of the knob 37 in one direction or another depending upon the direction of movement of the block 39.

As in the earlier described embodiment of the present invention, the knob 37 can be manually rotated without producing movement of the block 39. This is due in part to the fact that the material of the block is easily deformed and the quantum of friction between the knob 37 and the block 39 is less than the total quantum of friction between the plate 41 and the one wall of the casing and the friction between the strand 43 and the sheath 45. Although this friction is easily overcome by the push-pull forces exerted against the ring 29, this friction is sufficient to hold the block 39 against movement as the knob 37 is manually rotated.

It should now be seen that all illustrated embodiments of the present invention provide a very simple but yet efficient control device for operating a rotatably mounted shaft from a point remote from the shaft. The service life of the control device of the present invention is long, for there are no parts subject to any great stress in the operation of the device. In either embodiment the device of the present invention is extremely simple to install and can be installed without the use of any but ordinary tools.

Although the now preferred embodiment of the present invention has been shown and described herein, it is to be understood that the invention is not to be limited thereto, for it is susceptible to changes in form and detail within the scope of the appended claims.

I claim:

1. A remote control device for operating from a remote point of control a rotatable shaft carrying a manually operable knob comprising: a casing forming an enclosed passageway at least a part of which is defined by said knob; a block of sponge rubber mounted for movement in said passageway and frictionally engageable with said knob; an elongate shaft having an end thereof extending into said casing; swivel means interconnecting said end of the shaft and said block; and sheath means confining said shaft and mounting the same for reciprocal movement; reciprocal movement of said shaft moving said block along said passageway to frictionally drive said knob in one direction or the other depending upon the direction of movement of said shaft, the engagement between said knob and block of sponge rubber being such that the knob can be manually operated without producing movement of said block and elongate shaft.

2. A remote control device for operating from a remote point of control a rotatable shaft carrying a manually operable knob comprising: a casing forming an enclosed passageway at least a part of which is defined by said knob; a plate slidably engaging a wall of said casing; a block of resilient deformable material carried by said plate substantially filling said passageway and frictionally engageable with said knob; an elongate shaft having an end thereof extending into said casing; swivel means interconnecting said end of the shaft and said plate; and sheath means confining said shaft and mounting the same for reciprocal movement; reciprocal movement of said shaft moving said plate and the block carried thereby along said passageway, movement of said block imparting rotation to said knob in one direction or the other depending upon the direction of movement of said block, the engagement between said knob and block of resilient material being such that the knob can be manually operated without producing movement of said block and elongate shaft.

3. A remote control device for operating from a remote point of control a rotatable shaft carrying a manually operable knob comprising: a casing forming an enclosed annular passageway circumscribing said knob; a plate formed to engage the circumscribing wall of said casing; a block of resiliently deformable material bonded to said plate, mounted for movement in said passageway; an elongate shaft having an end thereof extending into said casing; swivel means interconnecting said end of the shaft and said plate; and sheath means confining said shaft and mounting the same for reciprocal movement; reciprocal movement of said shaft moving said block around said passageway to frictionally drive said knob in one direction or the other depending upon the direction of movement of said shaft, said block of resilient material being of such a size and shape relative to the size and shape of said passageway that the block resiliently deforms as the knob is operated without producing movement of said block and elongate shaft.

4. A remote control device for operating from a remote point of control a rotatable shaft carrying a manually operable knob comprising: an elongate casing forming an enclosed passageway, the one wall of said casing being formed with an opening; means for mounting said casing contiguous to said knob with the latter projecting through said opening; a block of resiliently deformable material mounted for movement in said passageway and frictionally engageable with said knob projecting through said opening; an elongate shaft having an end thereof extending into said casing; swivel means interconnecting said end of the shaft and said block; and sheath means confining said shaft and mounting the same for reciprocal movement; reciprocal movement of said shaft reciprocally moving said block along said passageway to frictionally drive said knob in one direction or the other depending upon the direction of movement of said shaft, the resilient material of said block being such that the same deforms as the knob is manually operated without producing movement of said block and elongate shaft.

5. A control device for operating from a remote place a rotatable shaft carrying at one end thereof a manually operable control knob, comprising: an elongate reciprocal member; a block of resiliently deformable material; swivel means connecting one end of said member to said block, whereby reciprocal movement of said member produces movement of said block; a casing to be mounted contiguous to said control knob and defining a passageway open to said knob for receiving and confining said block, said block having a cross-sectional shape and size substantially equal to the cross-sectional shape and size of said passageway; means fixed to the opposite end of said elongate member for reciprocally moving said member thereby to produce simultaneous movement of said block in said passageway in one direction or the other depending upon the direction of movement of said elongate member; movement of said block in said passageway rotatably driving said knob to adjust the relative angular position of said shaft.

6. A control device for operating from a remote place a rotatable shaft carrying at one end thereof a manually operable control knob, comprising: an elongate member having a reciprocally mounted element coextensive therewith; a block of resilient material; means connecting one end of said element to said block for movement therewith; a casing to be mounted contiguous to said control knob and defining a passageway opening onto said knob; said block being slidably received within said passageway and having such a cross-sectional shape and size relative to the cross-sectional shape and size of said passageway that said block is confined therein to frictionally engage said knob; means fixed to the opposite end of said elongate member for reciprocally moving said member thereby to produce simultaneous movement of said block in said passageway in one direction or the other depending upon the direction of movement of said elongate member; movement of said block in said passageway rotatably driving said knob to adjust the relative angular position of said shaft.

7. A control device for operating from a remote place a rotatable shaft carrying at one end thereof a manually operable control knob, comprising: an annular, hollow casing having an inner diameter slightly greater than the diameter of said knob, said casing being open at the inner side thereof and defining a circular passageway, said casing adapted to be mounted concentric with said shaft whereby said passageway circumscribes said knob; a block of resiliently deformable material mounted for movement within said passageway and engageable with said knob through the open side of said casing; an elongate reciprocable member; means connecting one end of said block to an end of said member extending into said passageway; means fixed to the opposite end of said elongate member for reciprocally moving said member, thereby to produce simultaneous movement of said block around said passageway in one direction or the other depending upon the direction of movement of said elongate member, the walls of said passageway guiding said block in said movement whereby said block rotatably drives said knob in one direction or the other as said elongate member is reciprocally moved.

8. A control device for operating from a remote place a rotatable shaft carrying at one end thereof a manually operable control knob, comprising: an elongate, hollow casing, said casing being open at the one side thereof and defining an elongate passageway, said casing adapted to be mounted adjacent said shaft whereby said passageway tangentially intersects the outer peripheral surface of said knob; a block of resilient material mounted within said passageway and engaging the peripheral surface of said knob; an elongate reciprocal member; means connecting one end of said member to said block for reciprocal movement therewith; means fixed to the opposite end of said elongate member for reciprocally moving said member, thereby to produce simultaneous movement of said block along said passageway in one direction or the other depending upon the direction of movement of said elongate member, said block in said movement rotatably driving said knob in one direction or the other as said elongate member is reciprocally moved, the material of said block deforming whenever said knob is manually operated whereby said knob may be rotated without producing movement of said block and reciprocal member.

RALPH W. WILDE, Sr.

References Cited in the file of this patent

UNITED STATES PATENTS

| Number | Name | Date |
| --- | --- | --- |
| 1,150,162 | Arnold | Aug. 17, 1915 |
| 1,718,942 | Bradley | July 2, 1929 |
| 2,111,694 | Schroder | Mar. 22, 1938 |
| 2,195,400 | Arens | Apr. 2, 1940 |